US012152977B1

(12) United States Patent
Wang et al.

(10) Patent No.: US 12,152,977 B1
(45) Date of Patent: Nov. 26, 2024

(54) METHOD FOR COMBINED CHARACTERIZATION OF PORE STRUCTURE

(71) Applicants: Southwest Petroleum University, Chengdu (CN); Oil & Gas Survey Center, China Geological Survey, Beijing (CN); SINOPEC Exploration Company, Chengdu (CN)

(72) Inventors: Xueying Wang, Chengdu (CN); Kun Zhang, Chengdu (CN); Yanhua Lin, Beijing (CN); Hulin Niu, Chengdu (CN); Yunbo Zhang, Beijing (CN); Xiangfeng Wei, Chengdu (CN); Zhujiang Liu, Chengdu (CN); Ruobing Liu, Chengdu (CN); Jingyu Hao, Chengdu (CN); Feiran Chen, Chengdu (CN); Daojun Wang, Chengdu (CN); Fubin Wei, Chengdu (CN); Jiayi Liu, Chengdu (CN); Lei Chen, Chengdu (CN); Xuefei Yang, Chengdu (CN); Fengli Han, Chengdu (CN); Xinyang He, Chengdu (CN); Jingru Ruan, Chengdu (CN); Hengfeng Gou, Chengdu (CN); Weishi Tang, Chengdu (CN); Lintao Li, Chengdu (CN); Yipeng Liu, Chengdu (CN); Ping Liu, Chengdu (CN)

(73) Assignees: Southwest Petroleum University, Chengdu (CN); Oil & Gas Survey Center, China Geological Survey, Beijing (CN); SINOPEC Exploration Company, Chengdu (CN)

( * ) Notice: Subject to any disclaimer, the term of this patent is extended or adjusted under 35 U.S.C. 154(b) by 0 days.

(21) Appl. No.: 18/822,472

(22) Filed: Sep. 3, 2024

(30) Foreign Application Priority Data

Sep. 28, 2023 (CN) .......................... 202311277481.6

(51) Int. Cl.
*G01N 15/08* (2006.01)
(52) U.S. Cl.
CPC . *G01N 15/0886* (2013.01); *G01N 2015/0813* (2013.01); *G01N 2015/0866* (2013.01)
(58) Field of Classification Search
CPC ............... G01N 15/08; G01N 15/0886; G01N 2015/0813; G01N 2015/0866
See application file for complete search history.

(56) References Cited

U.S. PATENT DOCUMENTS

2023/0096906 A1* 3/2023 Zhang ................ G01N 15/0886 73/38

OTHER PUBLICATIONS

Jun-yi, Liu et al. "Nano-pore structure characterization of shales using gas adsorption and mercury intrusion techniques", Journal of Chemical and Pharmaceutical Research, 2014, 6(4):850-857. (Year: 2014).*

(Continued)

*Primary Examiner* — Paul M. West (57) ABSTRACT

A method for combined characterization of pore structure includes steps as follows. Firstly, $CO_2$, $N_2$ and high-pressure mercury intrusion porosimetry characterization curves are plotted based on actual measurement data, then, average values of the overlapping range of the $CO_2$ and $N_2$ characterization curves are calculated, and a function $y_i'=f(x)$ is fitted. Each pore volume $y_i'$ corresponding to each pore diameter $x_i$ is calculated, and a curve is plotted with $x_i$ as a horizontal coordinate and $y_i'$ as a vertical coordinate, thereby obtaining a characterization curve of the overlapping range between $CO_2$ and $N_2$ adsorptions. The same data processing is used to process the overlapping range data of the $N_2$ and (Continued)

high-pressure mercury intrusion porosimetry characterization curves, to obtain the characterization curve between them. The characterization curves are spliced with the original $CO_2$, $N_2$, and high-pressure mercury intrusion porosimetry characterization curves to obtain a combined characterization curve.

1 Claim, 3 Drawing Sheets

(56) References Cited

OTHER PUBLICATIONS

Liang, Mingliang et al. "Evolution of pore structure in gas shale related to structural deformation", Fuel, vol. 197, Jun. 1, 2017, pp. 310-319. (Year: 2017).*

* cited by examiner

METHOD FOR COMBINED CHARACTERIZATION OF PORE STRUCTURE

CROSS-REFERENCE TO RELATED APPLICATION

This application claims priority to Chinese patent application No. CN 202311277481.6, filed to China National Intellectual Property Administration (CNIPA) on Sep. 28, 2023, which is herein incorporated by reference in its entirety.

TECHNICAL FIELD

The disclosure relates to the technical field of shale gas field development, and particularly to a method for combined characterization of a pore structure.

BACKGROUND

Shale gas is a typical type of unconventional natural gas. A matrix pore network in shale is composed of pores ranging from nanometer to micrometer diameters. Within a shale gas system, these pores, which are accompanied by natural fractures, form a seepage network that allows gas to flow from the shale to induced fractures during a development process. Currently, advanced research methods such as nano computed tomography focused ion beam scanning electron microscopy (nano-CT FIB-SEM), gas adsorption, high-pressure mercury intrusion porosimetry (MIP), and nuclear magnetic resonance are widely used to conduct extensive microscopic observations and analyses of the shale pore structure. Micropores refer to pores smaller than 2 nanometers (nm), mesopores refer to pores between 2 nm and 50 nm, and macropores refer to pores larger than 50 nm. Carbon dioxide adsorption experiments can characterize pores smaller than 3 nm, nitrogen adsorption experiments can characterize pores ranging from 1.6 nm to 200 nm, and high-pressure MIP experiments can characterize pores from 20 nm to 100,000 nm. Previous studies on the carbon dioxide adsorption experiments only took data smaller than 2 nm to represent the micropores; for the nitrogen adsorption experiments, only data between 2 nm and 50 nm were taken to represent the mesopores; for the high-pressure MIP experiments, only data larger than 50 nm were taken to represent the macropores. However, for overlapping parts of pore diameter ranges represented by the three methods, they were not processed properly and were simply deleted, which affected the accuracy of the combined characterization results.

SUMMARY

Addressing the issue that the current combined characterization method for pore structure, which simply deletes the overlapping parts in the characterization ranges of micropores, mesopores, and macropores, leads to large errors in the combined characterization results, the disclosure provides a method for combined characterization of pore structures.

The method for combined characterization of pore structures includes steps as follows.

S1, collecting actual measurement data of pore diameter ranges characterized by a carbon dioxide ($CO_2$) adsorption, a nitrogen ($N_2$) adsorption, and a mercury intrusion porosimetry; wherein the actual measurement data comprises a pore diameter and a pore volume;

for the $CO_2$ adsorption, taking the actual measurement data for the pore diameter less than 3 nanometers (nm), for the $N_2$ adsorption, taking the actual measurement data for the pore diameter in a range of 1.6-200 nm, and for the mercury intrusion porosimetry, taking the actual measurement data for the pore diameter in a range of 20-100,000 nm.

S2, plotting pore characterization curves with the pore diameter as a horizontal coordinate and the pore volume as a vertical coordinate based on the actual measurement data to obtain a $CO_2$ characterization curve, a $N_2$ characterization curve, and a mercury intrusion porosimetry characterization curve, respectively.

S3, performing data processing on an overlapping range of the pore diameter between the $CO_2$ characterization curve and the $N_2$ characterization curve, wherein the pore diameter in the overlapping range is in a range of 1.6 nm-3 nm.

The S3 specifically includes:

S31, taking an average value of pore volume data in the overlapping range of the pore diameter between the $CO_2$ characterization curve and the $N_2$ characterization curve, specifically, calculating an average value of a $CO_2$ pore volume and a $N_2$ pore volume corresponding to a same pore diameter, then forming a discrete point list of data points $[x_i, y_i]$ based on the average value of the pore volume and the pore diameter in the overlapping range, wherein $x_i$ represents the pore diameter, $y_i$ represents the average value of the pore volume, and i represents a number of the data points in the overlapping range, with i taking a value greater than or equal to 8;

S32, fitting a curve of $y_i'=f(x)$ passing through all the data points in the discrete point list based on the discrete point list of the data points $[x_i, y_i]$, thereby obtaining the function of $y_i'=f(x)$;

the S32 specifically includes:

letting an equation passing through a first point $(x_i, y_i)$ be defined as follows:

$$y=y_i \quad \text{(equation 1)},$$

letting an equation passing through a second point $(x_2, y_2)$ be defined as follows:

$$y=y_1+a_0(x-x_1) \quad \text{(equation 2)},$$

substituting the second point $(x_2, y_2)$ into the equation 2 to obtain $a_0$;

letting an equation passing through a third point $(x_3, y_3)$ be defined as follows:

$$y=y_1+a_0(x-x_1)+a_1(x-x_1)(x-x_2) \quad \text{(equation 3)},$$

substituting the third point $(x_3, y_3)$ into the equation 3 to obtain $a_1$;

letting an equation passing through a third point $(x_4, y_4)$ be defined as follows:

$$y=y_1+a_0(x-x_1)+a_1(x-x_1)(x-x_2)+a_2(x-x_1)(x-x_2)(x-x_3) \quad \text{(equation 4)},$$

substituting the third point $(x_4, y_4)$ into the equation 4 to obtain $a_2$;

sequentially obtaining $a_3, a_4, a_5 \ldots a_{i-2}$ based on the S32 based on the above equation defined means; and followed by obtaining the function of $y_i'=f(x)$ between the overlapping range of the $CO_2$ adsorption and the $N_2$ adsorption based on the obtained $a_0, a_1, a_2 \ldots a_{i-2}$ as follows:

$$y=y_1+a_0(x-x_1)+a_1(x-x_1)(x-x_2)+a_2(x-x_1)(x-x_2)(x-x_3)+a_3(x-x_1)(x-x_2)(x-x_3)(x-x_4)+ \ldots +a_{i-2}(x-x_1)(x-x_2)(x-x_3)(x-x_4) \ldots (x-x_{i-2})(x-x_{i-1}) \quad \text{(equation 5)};$$

S33, substituting each pore diameter $x_i$ into the function $y_i'=f(x)$ to calculate the corresponding pore volume $y_i'$ of each pore diameter $x_i$, plotting the curve with the pore diameter $x_i$ as the horizontal coordinate and the pore volume $y_i'$ as the vertical coordinate to obtain a characterization curve of the overlapping range of the pore diameter between the $CO_2$ characterization curve and the $N_2$ characterization curve.

S4, performing data processing on an overlapping range of the pore diameter between the $N_2$ characterization curve and the mercury intrusion porosimetry characterization curve, wherein the overlapping range of the pore diameter between the $N_2$ characterization curve and the mercury intrusion porosimetry characterization curve is in a range of 20 nm-200 nm, processing steps are the same in the steps S31 to S33, thereby to obtain a characterization curve of the overlapping range of the pore diameter between the $N_2$ characterization curve and the mercury intrusion porosimetry characterization curve.

S5, splicing and combining the characterization curve of the overlapping range of the pore diameter between the $CO_2$ characterization curve and the $N_2$ characterization curve, the characterization curve of the overlapping range of the pore diameter between the $N_2$ characterization curve and the mercury intrusion porosimetry characterization curve, with the $CO_2$ characterization curve, the $N_2$ characterization curve, and the mercury intrusion porosimetry characterization curve, thereby obtaining a combined characterization curve of the pore structure based on the $CO_2$ adsorption, the $N_2$ adsorption, and the mercury intrusion porosimetry.

In this situation, the combined characterization curve of the pore structure based on the adsorption results of the $CO_2$ adsorption, the $N_2$ adsorption, and the high-pressure mercury intrusion porosimetry is used to characterize the pore structure of shale to detect and determine a gas content in the shale, and then extract a natural gas in the shale.

Compared to the related art, the beneficial effects of the disclosure are as follows.

(1) In the related art, the overlapping ranges in the characterization pore diameters of the $CO_2$ adsorption, the nitrogen $N_2$ adsorption, and the mercury intrusion porosimetry are not processed. Instead, the overlapping ranges among them are simply deleted, which affects the accuracy of the combined characterization results. The method for data processing of the disclosure fits the overlapping ranges of the $CO_2$ characterization curve and the $N_2$ characterization curve from two curves into one curve, and also fits the overlapping ranges of the $N_2$ characterization curve and the high-pressure mercury intrusion porosimetry characterization curve into one curve. By employing the method for data processing of the disclosure, the overlapping ranges in the characterization pore diameter of the $CO_2$ adsorption, the nitrogen $N_2$ adsorption, and the mercury intrusion porosimetry can be processed, thereby enhancing accuracy.

(2) The disclosure utilizes mathematical methods to characterize the pore structure of the shale, which is used for predicting the production of the shale gas fields, enhancing the understanding of developed blocks, and allowing for timely adjustments to the overall development level and development effectiveness of the gas field based on predictions.

The other advantages, objectives, and features of the disclosure will be partially demonstrated through the following description, and partially understood by those skilled in the art through research and practice of the disclosure.

DETAILED DESCRIPTION OF EMBODIMENTS

An illustrated embodiment of the disclosure is described below in conjunction with the attached drawings. It should be understood that the illustrated embodiment described herein is only for illustrating and explaining the disclosure, and are not intended to limit the disclosure.

In an embodiment of the disclosure, firstly, actual measurement data representing pores diameter range of a $CO_2$ adsorption, a $N_2$ adsorption, and a high-pressure mercury intrusion porosimetry are collected, and the pores diameter range of the $CO_2$ adsorption, the $N_2$ adsorption, and the high-pressure mercury intrusion porosimetry are key data. The pore diameter range characterized by the $CO_2$ adsorption is less than 3 nm, and the pore diameter range characterized by the $N_2$ adsorption is 1.6-200 nm. The pore diameter range characterized by the high-pressure mercury intrusion porosimetry is 20-100,000 nm. It can be observed that the overlapping range of the pore diameters between the $CO_2$ adsorption and the $N_2$ adsorption is 1.6 nm to 3 nm, and the overlapping range of the pore diameters between the $N_2$ adsorption and high-pressure mercury intrusion porosimetry is 20 nm to 200 nm. The pore volumes measured by the $CO_2$ adsorption, the $N_2$ adsorption, and the high-pressure mercury intrusion porosimetry correspond to the pore diameters in a one-to-one manner, with the pore diameters as a horizontal coordinate and the pore volume as a vertical coordinate to plot characterization curves, thereby obtaining a $CO_2$ characterization curve, a $N_2$ characterization curve, and a high-pressure mercury intrusion porosimetry characterization curve, respectively.

Figure 1:
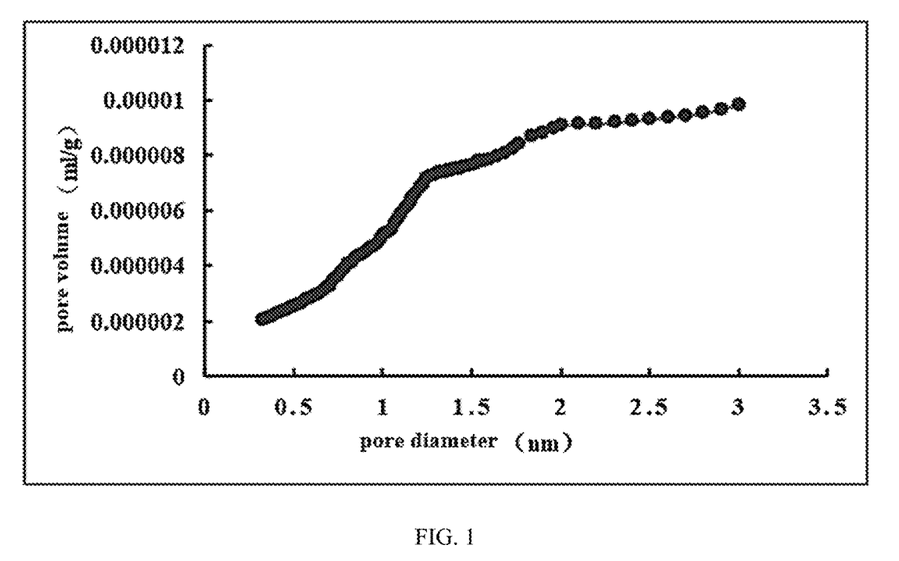
FIG. 1 illustrates a $CO_2$ characterization curve plotted based on actual data of a $CO_2$ adsorption.

FIG. 1 illustrates the $CO_2$ characterization curve plotted based on actual data of the $CO_2$ adsorption. The pore diameter range is from 0.25 nm to 3 nm. The trend is that as the pore diameter increases, the pore volume also increases, thereby obtaining the results of the pore volume of the $CO_2$ adsorption characterization.

Figure 2:
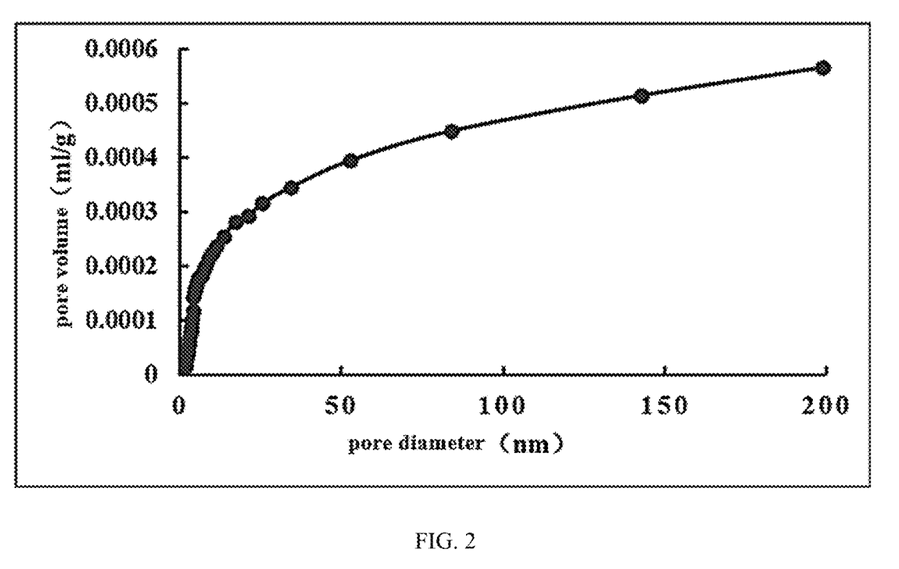
FIG. 2 illustrates a $N_2$ characterization curve plotted based on actual data of a $N_2$ adsorption.

FIG. 2 illustrates the $N_2$ characterization curve plotted based on actual data of the $N_2$ adsorption. The pore diameter range is from 1.6 nm to 200 nm. The trend is that as the pore diameter increases, the pore volume also increases, thereby obtaining the results of the pore volume of the $N_2$ adsorption characterization.

Figure 3:
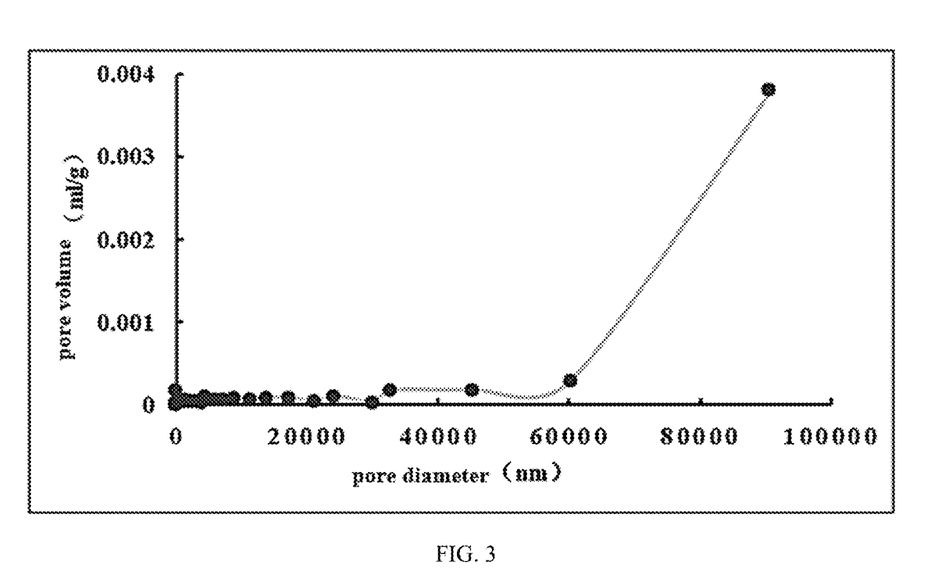
FIG. 3 illustrates a high-pressure mercury intrusion porosimetry characterization curve plotted based on actual data of a high-pressure mercury intrusion porosimetry.

FIG. 3 illustrates the high-pressure mercury intrusion porosimetry characterization curve plotted based on actual data of the high-pressure mercury intrusion porosimetry. The pore diameter range is from 20 nm to 100,000 nm. The trend is that as the pore diameter increases, the pore volume also increases, thereby obtaining the results of the pore volume of the high-pressure mercury intrusion porosimetry characterization.

A data processing is performed on an overlapping range of the pore diameters between the $CO_2$ characterization curve in FIG. 1 and the $N_2$ characterization curve in FIG. 2.

The overlapping range of the pore diameters of 1.6 nm to 3 nm are selected to calculate an average pore volume for $CO_2$ and $N_2$ pore volumes corresponding to the same pore diameter, followed by forming a discrete point list of data points $[x_i, y_i]$ for the overlapping range of the pore diameter data, where $x_i$ represents the pore diameter, $y_i$ represents the average value of the pore volume, and i represents a number of the data points in the overlapping range, with i taking a value of 8. The specific data of the discrete point list $[x_i, y_i]$ is shown in Table 1.

TABLE 1

Discrete point list of data points $[x_i, y_i]$ for the overlapping range of the pore diameter of the $CO_2$ and $N_2$ characterization curves

| pore diameter $x_i$ (nm) | pore volume $y_i$ (μL/g) |
| --- | --- |
| 1.6 | 0.00745 |
| 1.8 | 0.00736 |
| 2.0 | 0.00920 |
| 2.2 | 0.02010 |
| 2.4 | 0.02366 |
| 2.6 | 0.02801 |
| 2.8 | 0.03200 |
| 3.0 | 0.03823 |

(1) An equation passing through a first point $(x_1, y_1)=(1.6, 0.00745)$ is let be defined as follows:

$$y=y_1 \quad \text{(equation 1)},$$

(2) An equation passing through a second point $(x_2, y_2)=(1.8, 0.00736)$ is let be defined as follows:

$$y=y_1+a_0(x-x_1) \quad \text{(equation 2)},$$

the second point $(x_2, y_2)$ is substituted into the equation 2 to obtain $a_0=-0.00045$;

(3) An equation passing through a third point $(x_3, y_3)=(2.0, 0.00920)$ is let be defined as follows:

$$y=y_1+a_0(x-x_1)+a_1(x-x_1)(x-x_2) \quad \text{(equation 3)},$$

the third point $(x_3, y_3)=(2.0, 0.00920)$ is substituted into the equation 3 to obtain $a_1=0.024125$;

(4) An equation passing through a fourth point $(x_4, y_4)=(2.2, 0.02010)$ is let be defined as follows:

$$y=y_1+a_0(x-x_1)+a_1(x-x_1)(x-x_2)+a_2(x-x_1)(x-x_2)(x-x_3) \quad \text{(equation 4)},$$

the fourth point $(x_4, y_4)=(2.2, 0.02010)$ is substituted into the equation 4 to obtain $a_2=0.14854$;

(5) An equation passing through a fifth point $(x_5, y_5)=(2.4, 0.02366)$ is let be defined as follows:

$$y=y_1+a_0(x-x_1)+a_1(x-x_1)(x-x_2)+a_2(x-x_1)(x-x_2)(x-x_3)+a_3(x-x_1)(x-x_2)(x-x_3)(x-x_4) \quad \text{(equation 5)},$$

the fifth point $(x_5, y_5)=(2.4, 0.02366)$ is substituted into the equation 5 to obtain $a_3=-0.61275$;

(6) An equation passing through a sixth point $(x_6, y_6)=(2.6, 0.02801)$ is let be defined as follows:

$$y=y_1+a_0(x-x_1)+a_1(x-x_1)(x-x_2)+a_2(x-x_1)(x-x_2)(x-x_3)+a_3(x-x_1)(x-x_2)(x-x_3)(x-x_4)+a_4(x-x_1)(x-x_2)(x-x_3)(x-x_4)(x-x_5) \quad \text{(equation 6)},$$

the sixth point $(x_6, y_6)=(2.6, 0.02801)$ is substituted into the equation 6 to obtain $a_4=1.25153$;

(7) An equation passing through a seventh point $(x_7, y_7)=(2.8, 0.03200)$ is let be defined as follows:

$$y=y_1+a_0(x-x_1)+a_1(x-x_1)(x-x_2)+a_2(x-x_1)(x-x_2)(x-x_3)+a_3(x-x_1)(x-x_2)(x-x_3)(x-x_4)+a_4(x-x_1)(x-x_2)(x-x_3)(x-x_4)(x-x_5)+a_5(x-x_1)(x-x_2)(x-x_3)(x-x_4)(x-x_5)(x-x_6) \quad \text{(equation 7)},$$

the seventh point $(x_7, y_7)=(2.8, 0.03200)$ is substituted into the equation 7 to obtain $a_5=-1.77663$;

(8) An equation passing through a eighth point $(x_8, y_8)=(3.0, 0.03823)$ is let be defined as follows:

$$y=y_1+a_0(x-x)+a(x-x_1)(x-x_2)+a_2(x-x_1)(x-x_2)(x-x_3)+a_3(x-x_1)(x-x_2)(x-x_3)(x-x_4)+a_4(x-x_1)(x-x_2)(x-x_3)(x-x_4)(x-x_5)+a_5(x-x_1)(x-x_2)(x-x_3)(x-x_4)(x-x_5)(x-x_6)+a_6(x-x_1)(x-x_2)(x-x_3)(x-x_4)(x-x_5)(x-x_6)(x-x_7) \quad \text{(equation 8)},$$

the eighth point $(x_8, y_8)=(3.0, 0.03823)$ is substituted into the equation 8 to obtain $a_6=1.99459$.

A relationship equation of the final function $y_i=f(x)$ obtained by fitting the overlapping range of $CO_2$ adsorption and $N_2$ adsorption is as follows:

$$y'=0.00745-0.00045(x-1.6)+0.24125(x-1.6)(x-1.8)-0.93708(x-1.6)(x-1.8)(x-2.0)+2.10089(x-1.6)(x-1.8)(x-2.0)(x-2.2)-3.26986(x-1.6)(x-1.8)(x-2.0)(x-2.2)(x-2.4)+3.87261(x-1.6)(x-1.8)(x-2.0)(x-2.2)(x-2.4)(x-2.6)-3.65096(x-1.6)(x-1.8)(x-2.0)(x-2.2)(x-2.4)(x-2.6)(x-2.8) \quad \text{(equation 9)}.$$

Each pore diameter value is substituted in the overlapping range of 1.6 nm-3 nm between the $CO_2$ adsorption and the $N_2$ adsorption into the equation 9 to calculate the final pore volume of the overlapping range of the $CO_2$ adsorption and the $N_2$ adsorption, as shown in Table 2.

TABLE 2

Pore diameter and pore volume data for the overlapping range between the $CO_2$ and $N_2$ characterization curves

| pore diameter (nm) | pore volume (μL/g) |
| --- | --- |
| 1.6 | 0.00745 |
| 1.7 | 0.0136 |
| 1.8 | 0.00736 |
| 1.9 | 0.00535 |
| 2.0 | 0.00920 |
| 2.1 | 0.01527 |
| 2.2 | 0.02010 |
| 2.3 | 0.02255 |
| 2.4 | 0.02366 |
| 2.5 | 0.02520 |
| 2.6 | 0.02801 |
| 2.7 | 0.03101 |
| 2.8 | 0.03200 |
| 2.9 | 0.03113 |
| 3.0 | 0.03823 |

Figure 4:
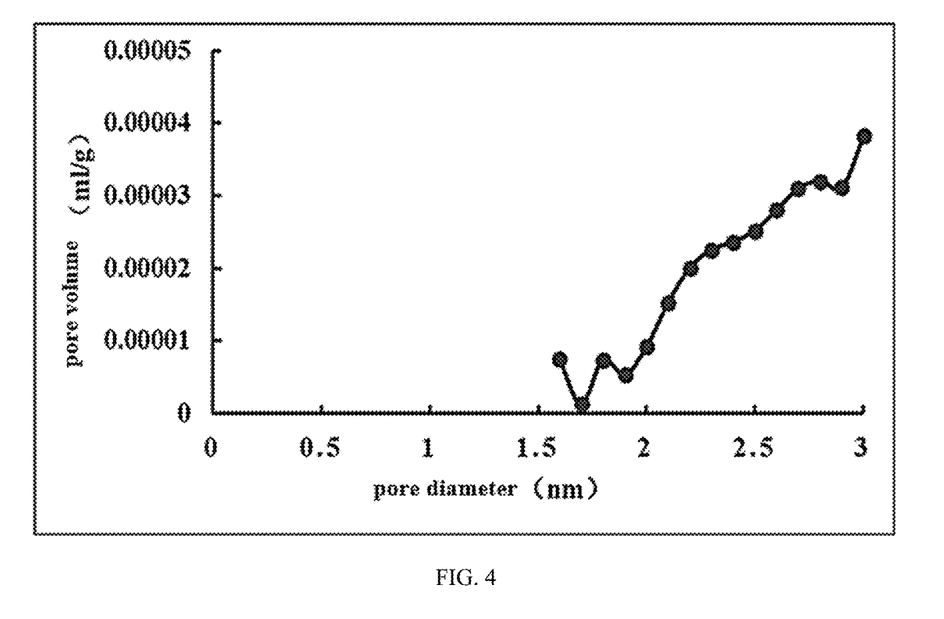
FIG. 4 illustrates a characterization curve combined the $CO_2$ adsorption and the $N_2$ adsorption in a pore diameter range of 1.6 nm to 3 nm.

The characterization curve of the overlapping range between the $CO_2$ absorption and the $N_2$ absorption is plotted based on the data in Table 2, as shown in FIG. 4.

The same data processing is used to process the overlapping range of the pore diameters between the $N_2$ characterization curve and the high-pressure mercury intrusion porosimetry characterization curve.

The overlapping range of the pore diameters of 20 nm to 200 nm are selected to calculate an average pore volume for the $N_2$ adsorption and the high-pressure mercury intrusion porosimetry corresponding to the same pore diameter, followed by forming a discrete point list of data points $[u_i, v_i]$ for the overlapping range of the pore diameter data, where $u_i$ represents the pore diameter, $v_i$ represents the average value of the pore volume, and the specific data of the discrete point list $[u_i, v_i]$ is shown in Table 3.

TABLE 1

Discrete point list of data points $[u_i, v_i]$ for the overlapping range of the pore diameter of the $N_2$ and high-pressure mercury intrusion porosimetry characterization curves

| pore diameter (nm) | pore volume (µL/g) |
|---|---|
| 20 | 0.42653 |
| 40 | 0.48291 |
| 60 | 0.51302 |
| 80 | 0.54216 |
| 100 | 0.62865 |
| 120 | 0.69838 |
| 140 | 0.76387 |
| 160 | 0.81548 |
| 180 | 0.88295 |
| 200 | 0.90359 |

(1) An equation passing through a first point $(u_i,v_i)=(20, 0.42653)$ is let be defined as follows:

$$v=v_1 \quad \text{(equation 10)},$$

(2) An equation passing through a second point $(u_2,v_2)=(40, 0.48291)$ is let be defined as follows:

$$v=v_1+b_0(u-u_1) \quad \text{(equation 11)},$$

the second point $(u_2,v_2)=(40, 0.48291)$ is substituted into the equation 11 to obtain $b_0=0.00282$;

(3) An equation passing through a third point $(u_3,v_3)=(60, 0.51302)$ is let be defined as follows:

$$v=v_1+b_0(u-u_1)+b_1(u-u_1)(u-u_2) \quad \text{(equation 12)},$$

the third point $(u_3,v_3)=(60, 0.51302)$ is substituted into the equation 12 to obtain $b_1=-3.28375\times10^{-5}$;

(4) An equation passing through a fourth point $(u_4,v_4)=(80, 0.54216)$ is let be defined as follows:

$$v=v_1+b_0(u-u_1)+b_1(u-u_1)(u-u_2)+b_2(u-u_1)(u-u_2)(u-u_3) \quad \text{(equation 13)},$$

the fourth point $(u_4,v_4)=(80, 0.54216)$ is substituted into the equation 13 to obtain $b_2=5.27083\times10^{-7}$;

(5) An equation passing through a fifth point $(u_5,v_5)=(100, 0.62865)$ is let be defined as follows:

$$v=v_1+b_0(u-u_1)+b_1(u-u_1)(u-u_2)+b_2(u-u_1)(u-u_2)(u-u_3)+b_3(u-u_1)(u-u_2)(u-u_3)(u-u_4) \quad \text{(equation 14)},$$

the fifth point $(u_5,v_5)=(100, 0.62865)$ is substituted into the equation 14 to obtain $b_3=8.59895\times10^{-9}$;

(6) An equation passing through a sixth point $(u_6,v_6)=(120, 0.69838)$ is let be defined as follows:

$$v=v_1+b_0(u-u_1)+b_1(u-u_1)(u-u_2)+b_2(u-u_1)(u-u_2)(u-u_3)+b_3(u-u_1)(u-u_2)(u-u_3)(u-u_4)+b_4(u-u_1)(u-u_2)(u-u_3)(u-u_4)(u-u_5) \quad \text{(equation 15)},$$

the sixth point $(u_6,v_6)=(120, 0.69838)$ is substituted into the equation 15 to obtain $b_4=-4.30859\times10^{-10}$;

(7) An equation passing through a seventh point $(u_7,v_7)=(140, 0.76387)$ is let be defined as follows:

$$v=v_1+b_0(u-u_1)+b_1(u-u_1)(u-u_2)+b_2(u-u_1)(u-u_2)(u-u_3)+b_3(u-u_1)(u-u_2)(u-u_3)(u-u_4)+b_4(u-u_1)(u-u_2)(u-u_3)(u-u_4)(u-u_5)+b_5(u-u_1)(u-u_2)(u-u_3)(u-u_4)(u-u_5)(u-u_6) \quad \text{(equation 16)},$$

the seventh point $(u_7,v_7)=(140, 0.76387)$ is substituted into the equation 16 to obtain $b_5=8.34440\times10^{-12}$;

(8) An equation passing through a eighth point $(u_8,v_8)=(160, 0.81548)$ is let be defined as follows:

$$v=v_1+b_0(u-u_1)+b_1(u-u_1)(u-u_2)+b_2(u-u_1)(u-u_2)(u-u_3)+b_3(u-u_1)(u-u_2)(u-u_3)(u-u_4)+b_4(u-u_1)(u-u_2)(u-u_3)(u-u_4)(u-u_5)+b_5(u-u_1)(u-u_2)(u-u_3)(u-u_4)(u-u_5)(u-u_6)+b_6(u-u_1)(u-u_2)(u-u_3)(u-u_4)(u-u_5)(u-u_6)(u-u_7) \quad \text{(equation 17)},$$

the eighth point $(u_8,v_8)=(160, 0.81548)$ is substituted into the equation 17 to obtain $b_6=-1.10423\times10^{-13}$;

(9) An equation passing through a ninth point $(u_9,v_9)=(180, 0.88295)$ is let be defined as follows:

$$v=v_1+b_0(u-u_1)+b_1(u-u_1)(u-u_2)+b_2(u-u_1)(u-u_2)(u-u_3)+b_3(u-u_1)(u-u_2)(u-u_3)(u-u_4)+b_4(u-u_1)(u-u_2)(u-u_3)(u-u_4)(u-u_5)+b_5(u-u_1)(u-u_2)(u-u_3)(u-u_4)(u-u_5)(u-u_6)+b_6(u-u_1)(u-u_2)(u-u_3)(u-u_4)(u-u_5)(u-u_6)(u-u_7)+b_7(u-u_1)(u-u_2)(u-u_3)(u-u_4)(u-u_5)(u-u_6)(u-u_7)(u-u_8) \quad \text{(equation 18)},$$

the eighth point $(u_9,v_9)=(180, 0.88295)$ is substituted into the equation 18 to obtain $b_7=1.17279\times10^{-15}$;

(10) An equation passing through a tenth point $(u_{10},v_{10})=(200, 0.90359)$ is let be defined as follows:

$$v=v_1+b_0(u-u_1)+b_1(u-u_1)(u-u_2)+b_2(u-u_1)(u-u_2)(u-u_3)+b_3(u-u_1)(u-u_2)(u-u_3)(u-u_4)+b_4(u-u_1)(u-u_2)(u-u_3)(u-u_4)(u-u_5)+8.344401\times10^{-12}(u-u_1)(u-u_2)(u-u_3)(u-u_4)(u-u_5)(u-u_6)+b_6(u-u_1)(u-u_2)(u-u_3)(u-u_4)(u-u_5)(u-u_6)(u-u_7)+b_7(u-u_1)(u-u_2)(u-u_3)(u-u_4)(u-u_5)(u-u_6)(u-u_7)(u-u_5)+b_5(u-u_1)(u-u_2)(u-u_3)(u-u_4)(u-u_5)(u-u_6)(u-u_7)(u-u_8)(u-u_9) \quad \text{(equation 19)},$$

the eighth point $(u_{10},v_{10})=(200, 0.90359)$ is substituted into the equation 19 to obtain $b_8=-1.11543\times10^{-17}$.

A relationship equation of the final function $y_i'=f(x)$ obtained by fitting the overlapping range of the $N_2$ adsorption and the high-pressure mercury intrusion porosimetry is as follows:

$$v'=0.42653+0.00282(u-20)-3.28375\times10^{-5}(u-20)(u-40)+5.27083\times10^{-7}(u-20)(u-40)(u-60)+8.59895\times10^{-9}(u-20)(u-40)(u-60)(u-80)-4.30859\times10^{-12}(u-20)(u-40)(u-60)(u-80)(u-100)+8.34440\times10^{-12}(u-20)(u-40)(u-60)(u-80)(u-100)(u-120)-1.10423\times10^{-13}(u-20)(u-40)(u-60)(u-80)(u-100)(u-120)(u-140)+1.17279\times10^{-15}(u-20)(u-40)(u-60)(u-80)(u-100)(u-120)(u-140)(u-160)-1.11543\times10^{-17}(u-20)(u-40)(u-60)(u-80)(u-100)(u-120)(u-140)(u-160)(u-180) \quad \text{(equation 20)}.$$

Each pore diameter value is substituted in the overlapping range of 20 nm-200 nm between the $N_2$ adsorption and the high-pressure mercury intrusion porosimetry into the equation 20 to calculate the final pore volume of the overlapping range of the $N_2$ adsorption and the high-pressure mercury intrusion porosimetry, as shown in Table 4.

TABLE 4

Pore diameter and pore volume data for the overlapping range between the $N_2$ and high-pressure mercury intrusion porosimetry characterization curves

| pore diameter (nm) | pore volume (μL/g) |
| --- | --- |
| 20 | 0.42653 |
| 30 | 0.39595 |
| 40 | 0.48291 |
| 50 | 0.51632 |
| 60 | 0.51302 |
| 70 | 0.51588 |
| 80 | 0.54216 |
| 90 | 0.58459 |
| 100 | 0.62865 |
| 110 | 0.66615 |
| 120 | 0.69838 |
| 130 | 0.73049 |
| 140 | 0.76387 |
| 150 | 0.79368 |
| 160 | 0.81548 |
| 170 | 0.83739 |
| 180 | 0.88295 |
| 190 | 0.95398 |
| 200 | 0.90359 |

Figure 5:
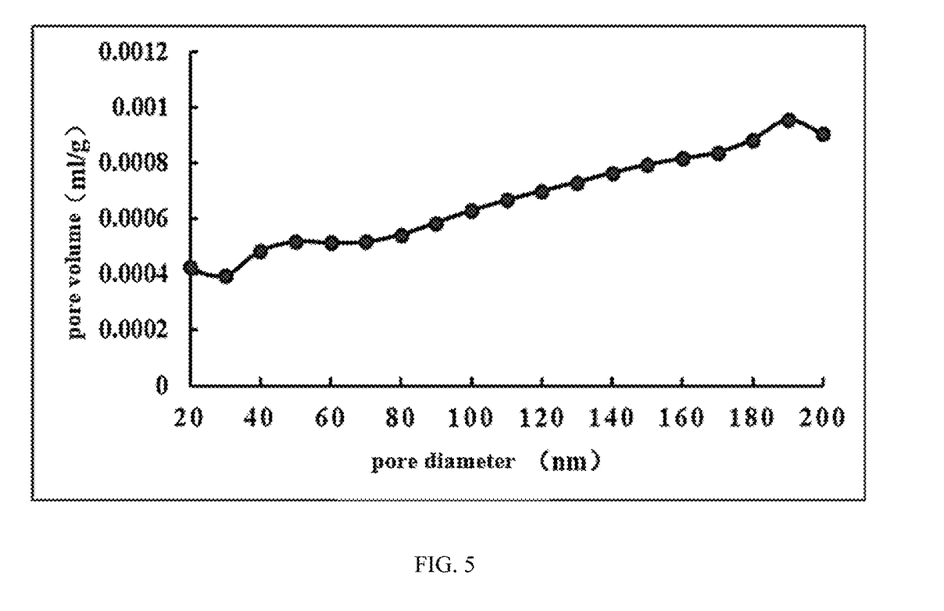
FIG. 5 illustrates a characterization curve combined the $N_2$ adsorption and the high-pressure mercury intrusion porosimetry in a pore diameter range of 20 nm to 200 nm.

The characterization curve of the overlapping range between the $N_2$ absorption and the high-pressure mercury intrusion porosimetry is plotted based on the data in Table 4, as shown in FIG. 5.

Figure 6:
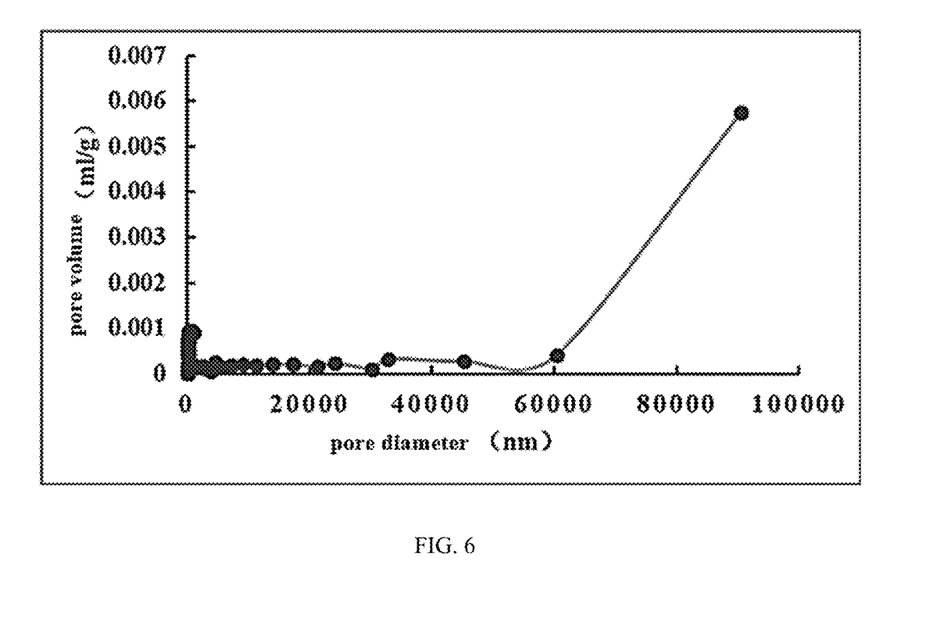
FIG. 6 illustrates a characterization curve of a full pore diameter range combined the $CO_2$ adsorption, the $N_2$ adsorption, and the high-pressure mercury intrusion porosimetry.

Finally, the characterization curves of the overlapping range of the pore diameters between the $CO_2$ characterization curve and the $N_2$ characterization curve as shown in FIG. 4, the characterization curve of the overlapping range of the pore diameters between the $N_2$ characterization curve and the high-pressure mercury intrusion porosimetry characterization curve as shown in FIG. 5, as well as the original $CO_2$ characterization curve (FIG. 1), the $N_2$ characterization curve (FIG. 2), and the high-pressure mercury intrusion porosimetry characterization curve (FIG. 3) are combined and spliced together to ultimately form a combined characterization curve of the pore structure based on the results of the $CO_2$ adsorption, the nitrogen $N_2$ adsorption, and the mercury intrusion porosimetry, as shown in FIG. 6.

The above description is merely a preferred embodiment of the disclosure, and does not in any way limit the disclosure. Although the disclosure has been disclosed in detail through the preferred embodiment, it is not intended to limit the disclosure. Those skilled in the art, without departing from the scope of the technical solution of the disclosure, can make minor modifications or amendments that are equivalent to the equivalent embodiments based on the technical content disclosed above. Any simple modifications, equivalent changes, and amendments made to the above embodiment in accordance with the technical essence of the disclosure still fall within the scope of the technical solution of the disclosure.

What is claimed is:

1. A method for combined characterization of a pore structure, comprising:
    S1, collecting actual measurement data of pore diameter ranges characterized by a carbon dioxide ($CO_2$) adsorption, a nitrogen ($N_2$) adsorption, and a mercury intrusion porosimetry; wherein the actual measurement data comprises a pore diameter and a pore volume;
    for the $CO_2$ adsorption, taking the actual measurement data for the pore diameter less than 3 nanometers (nm), for the $N_2$ adsorption, taking the actual measurement data for the pore diameter in a range of 1.6-200 nm, and for the mercury intrusion porosimetry, taking the actual measurement data for the pore diameter in a range of 20-100,000 nm;
    S2, plotting pore characterization curves with the pore diameter as a horizontal coordinate and the pore volume as a vertical coordinate based on the actual measurement data to obtain a $CO_2$ characterization curve, a $N_2$ characterization curve, and a mercury intrusion porosimetry characterization curve, respectively;
    S3, performing data processing on an overlapping range of the pore diameter between the $CO_2$ characterization curve and the $N_2$ characterization curve, wherein the pore diameter in the overlapping range is in a range of 1.6 nm-3 nm;
    wherein the step S3 specifically comprises:
        S31, taking an average value of pore volume data in the overlapping range of the pore diameter between the $CO_2$ characterization curve and the $N_2$ characterization curve, specifically, calculating an average value of a $CO_2$ pore volume and a $N_2$ pore volume corresponding to a same pore diameter, then forming a discrete point list of data points $[x_i, y_i]$ based on the average value of the pore volume and the pore diameter in the overlapping range, wherein $x_i$ represents the pore diameter, $y_i$ represents the average value of the pore volume, and i represents a number of the data points in the overlapping range, with i taking a value greater than or equal to 8;
        S32, fitting a curve of $y_i'=f(x)$ passing through all the data points in the discrete point list based on the discrete point list of the data points $[x_i, y_i]$, thereby obtaining the function of $y_i'=f(x)$;
    wherein the step S32 specifically comprises:
        letting an equation passing through a first point $(x_i, y_i)$ be defined as follows:

$$y=y_1 \quad \text{(equation 1)},$$

letting an equation passing through a second point $(x_2, y_2)$ be defined as follows:

$$y=y_1+a_0(x-x_1) \quad \text{(equation 2)},$$

substituting the second point $(x_2, y_2)$ into the equation 2 to obtain $a_0$;
        letting an equation passing through a third point $(x_3, y_3)$ be defined as follows:

$$y=y_1+a_0(x-x_1)+a_1(x-x_1)(x-x_2) \quad \text{(equation 3)},$$

substituting the third point $(x_3, y_3)$ into the equation 3 to obtain $a_1$;
        letting an equation passing through a third point $(x_4, y_4)$ be defined as follows:

$$y=y_1+a_0(x-x_1)+a_1(x-x_1)(x-x_2)+a_2(x-x_i)(x-x_2)(x-x_3) \quad \text{(equation 4)},$$

substituting the third point $(x_4, y_4)$ into the equation 4 to obtain $a_2$;
        sequentially obtaining $a_3, a_4, a_5 \ldots a_{i-2}$ based on the S32 based on the above equation defined means; and
        followed by obtaining the function of $y_i'=f(x)$ between the overlapping range of the $CO_2$ adsorption and the $N_2$ adsorption based on the obtained $a_0, a_1, a_2 \ldots a_{i-2}$ as follows:

$$y=y_1+a_0(x-x_1)+a_1(x-x_1)(x-x_2)+a_2(x-x_1)(x-x_2)(x-x_3)+a_3(x-x_1)(x-x_2)(x-x_3)(x-x_4)+\ldots+a_{i-2}(x-x_i)(x-x_2)(x-x_3)(x-x_4)\ldots(x-x_{i-2})(x-x_{i-1}) \quad \text{(equation 5)};$$

S33, substituting each pore diameter $x_i$ into the function $y_i'=f(x)$ to calculate the corresponding pore volume $y_i'$ of each pore diameter $x_i$, plotting the curve with the pore diameter $x_i$ as the horizontal coordinate and the pore volume $y_i'$ as the vertical coordinate to obtain a characterization curve of the overlapping range of the pore diameter between the $CO_2$ characterization curve and the $N_2$ characterization curve;

S4, performing data processing on an overlapping range of the pore diameter between the $N_2$ characterization curve and the mercury intrusion porosimetry characterization curve, wherein the overlapping range of the pore diameter between the $N_2$ characterization curve and the mercury intrusion porosimetry characterization curve is in a range of 20 nm-200 nm, processing steps are the same in the steps S31 to S33, thereby to obtain a characterization curve of the overlapping range of the pore diameter between the $N_2$ characterization curve and the mercury intrusion porosimetry characterization curve; and S5, splicing and combining the characterization curve of the overlapping range of the pore diameter between the $CO_2$ characterization curve and the $N_2$ characterization curve, the characterization curve of the overlapping range of the pore diameter between the $N_2$ characterization curve and the mercury intrusion porosimetry characterization curve, with the $CO_2$ characterization curve, the $N_2$ characterization curve, and the mercury intrusion porosimetry characterization curve, thereby obtaining a combined characterization curve of the pore structure based on the $CO_2$ adsorption, the $N_2$ adsorption, and the mercury intrusion porosimetry.

\* \* \* \* \*